US008620142B2

United States Patent
Morikawa

(10) Patent No.: US 8,620,142 B2
(45) Date of Patent: Dec. 31, 2013

(54) VIDEO PLAYER AND VIDEO PLAYBACK METHOD

(75) Inventor: Kenichi Morikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 12/717,820

(22) Filed: Mar. 4, 2010

(65) Prior Publication Data

US 2010/0226622 A1 Sep. 9, 2010

(30) Foreign Application Priority Data

Mar. 9, 2009 (JP) ................................ 2009-055213

(51) Int. Cl.
- *H04N 9/80* (2006.01)
- *H04N 5/92* (2006.01)
- *H04N 7/01* (2006.01)
- *H04N 7/12* (2006.01)
- *H04N 7/025* (2006.01)
- *G06T 11/40* (2006.01)
- *G09G 5/36* (2006.01)

(52) U.S. Cl.
USPC ........... 386/248; 386/239; 386/241; 386/340; 345/547; 345/552; 348/441; 375/240.01; 725/35

(58) Field of Classification Search
USPC .......... 386/248, 239, 241, 34, E5.001, E5.02, 386/E5.0523, 340; 345/547, 552; 348/441, 348/E5.007, E7.001; 375/240.01, E7.02, 375/E7.026; 725/35

See application file for complete search history.

(56) References Cited

U.S. PATENT DOCUMENTS

| 7,804,505 B2 * | 9/2010 | Watanabe et al. .............. 345/547 |
| 2004/0022521 A1 | 2/2004 | Kishi et al. |
| 2004/0151471 A1 | 8/2004 | Ogikubo |
| 2006/0233522 A1 * | 10/2006 | Hiroi et al. ...................... 386/95 |
| 2009/0300676 A1 * | 12/2009 | Harter, Jr. ........................ 725/35 |

FOREIGN PATENT DOCUMENTS

| CN | 101088289 A | 12/2007 |
| JP | 2006-324941 A | 11/2006 |
| JP | 2007-166501 A | 6/2007 |

* cited by examiner

Primary Examiner — Gelek W Topgyal
Assistant Examiner — Syed Hasan
(74) Attorney, Agent, or Firm — Canon USA Inc. IP Division

(57) ABSTRACT

When multi-frame rate contents including many high framerate portions are played back in a video player, a playback can be easily selected by showing to a user a playback time in respective playback modes of a normal playback and a slow playback. The video player includes a rate analysis unit for calculating playback time in the respective playback modes by analyzing a frame rate of multi-frame rate contents, and thumbnail images of multi-frame rate contents and playback time in the respective playback modes are listed and displayed as display units in a pair with respect to a plurality of contents.

13 Claims, 8 Drawing Sheets

FIG.2

202 CONTENT INFORMATION

CONTENT A

| SCENE | NORMAL PLAYBACK TIME | HIGH FRAME-RATE PORTION | SLOW PLAYBACK |
|---|---|---|---|
| 1 | 5 MINUTES | × | |
| 2 | 10 SECONDS | 5 TIMES AS HIGH | 50 SECONDS |
| 3 | 2 MINUTES | × | |
| 4 | 20 SECONDS | TWICE AS HIGH | 40 SECONDS |
| 5 | 3 MINUTES | × | |

TOTAL PLAYBACK TIME OF ENTIRE CONTENT
NORMAL PLAYBACK TIME    10' 30"
SLOW PLAYBACK           11' 30"

FIG.8

801 FRAME RATE INFORMATION

CONTENT A

| TIME STAMP (h.m.s) | FRAME RATE (fps) |
|---|---|
| 00.00.00 | 60 |
| 00.05.00 | 300 |
| 00.05.10 | 60 |
| 00.07.10 | 120 |
| 00.07.30 | 60 |
| 00.10.30 | end |

VIDEO PLAYER AND VIDEO PLAYBACK METHOD

BACKGROUND OF THE INVENTION

1. Field of the Invention

The invention relates to a video player and a video playback method capable of playing back video contents in a plurality of playback modes using frame rate information of video contents.

2. Description of the Related Art

There are known the contents which include motion pictures shot at a high frame rate exceeding 1000 fps and can be played back at a slow speed in a smooth motion. There are both a case where entire contents are composed of videos shot at a high frame rate and a case where contents include videos of a particular scene (which captured an instant of a prompt motion) shot at the high frame rate, only in a part of the contents.

The contents within which the frame rate changes as in the latter case are termed multi-frame rate contents. In the multi-frame rate contents, there is a case where the playback frame rate is adjusted by decimating out frames in a high frame-rate portion and a case where a high frame-rate portion is automatically played in slow motion. Japanese Patent Application Laid-Open Publication No. 2006-324941 discusses an image process apparatus that when a high frame rate portion, which has an effect in improving an image quality, is extracted in multi-frame rate contents, the image process apparatus causes a user to recognize the high frame rate portion by an information display unit or an indicator.

When the user views the multi-frame rate contents, the user can select either a normal playback mode or a slow playback mode. In the normal playback mode, a high frame-rate portion is played back by adjusting a playback time by decimating out frames in the high frame-rate portion. In the slow playback mode, the high frame-rate portion is played back without decimating out frames. Accordingly, in the multi-frame rate contents, since a playback time is different depending on whether a normal playback is employed or a slow playback is employed, a viewing state of the user is affected depending on which of them is selected. For example, when contents which are finished in 1 hour in the normal playback are played back in the slow playback, it may take 1 hour and 15 minutes.

When the user selects between the normal playback and the slow playback, since viewing time of the respective playback modes is not previously presented, the user cannot smoothly select a playback mode Further, except a case where a playback mode is selected throughout entire multi-frame rate contents, there is also a case where when a scene of a high frame rate appears in a mid-portion of playback, the user can select a playback mode. Also in this case, since necessary playback time is not presented when the scene is played back at a slow speed, the user cannot smoothly select the playback mode.

SUMMARY OF THE INVENTION

According to an aspect of the invention, a video player for playing back video contents composed of a first portion recorded at a first frame rate and a second portion recorded at a second frame rate higher than the first frame rate includes an input unit for inputting video data of the video contents, an analysis unit for calculating a first playback time when the entire video contents are played back by applying a first frame decimating process to video data in the second portion, and a second playback time when the entire video contents are played back without a frame decimating process or played back by applying a second frame decimating process having a smaller number of frames to be decimated out than the first frame decimating process, to video data in the second portion based on a predetermined playback frame rate, a graphics processing unit for generating graphic data to display the first and second playback time, and an image processing unit for causing a display device to display video images based on the graphic data.

According to the present invention, when multi-frame rate contents are viewed, since playback time when a normal playback mode is employed and playback time when a slow playback mode is employed are shown to a user, the user can properly determine which of the modes is to be employed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is an explanatory view illustrating substance of content information.

FIG. 8 is an explanatory view illustrating contents of frame rate information.

DESCRIPTION OF THE EMBODIMENTS

Various exemplary embodiments, features, and aspects of the invention will be described in detail below with reference to the drawings.

Figure 1:
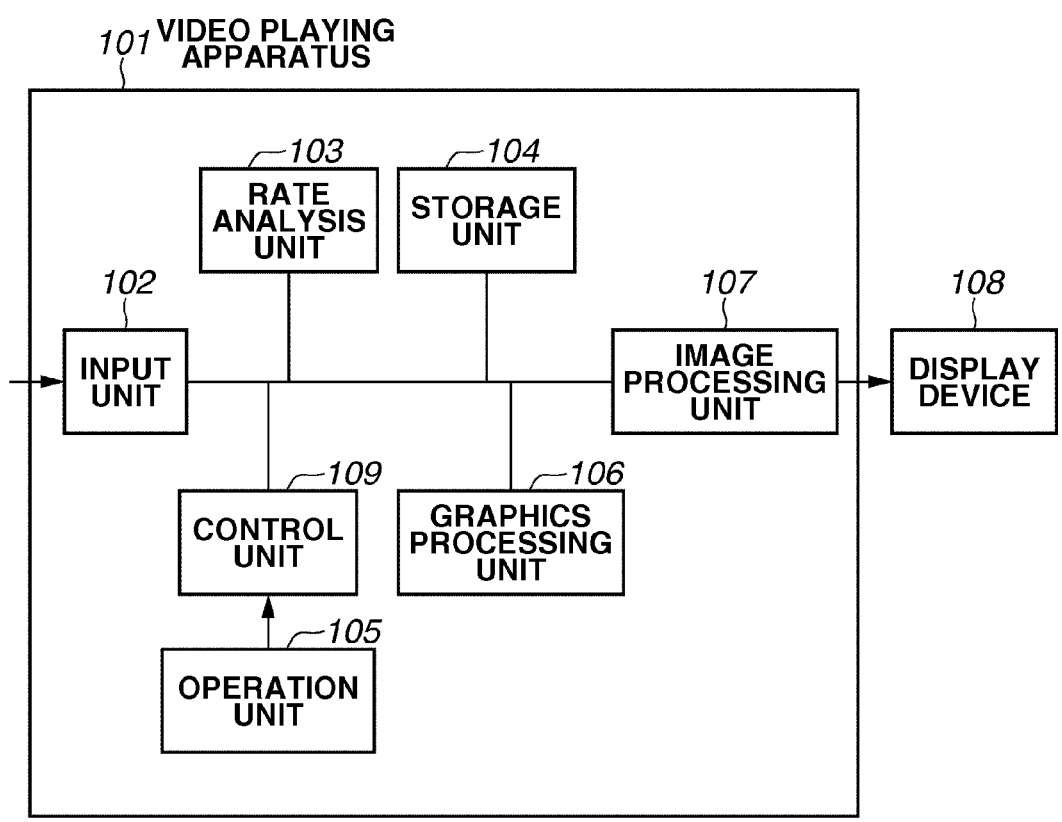
FIG. 1 is a block diagram illustrating a configuration of a video player according to an exemplary embodiment of the present invention.

FIG. 1 is a block diagram illustrating a configuration of a video playing apparatus 101 of the invention.

In a first exemplary embodiment, an input unit 102 is an input interface of video contents. Input sources include a digital TV broadcast, external equipment, and a contents server via a network. Video data of input contents is transferred to a rate analysis unit 103 in a succeeding stage.

In the exemplary embodiment, the video contents are assumed to be multi-frame rate contents. The multi-frame rate contents are composed of a high frame-rate portion (second portion) of a high frame rate (second frame rate) and an ordinary frame rate portion (first portion) of an ordinary frame rate (first frame rate).

The rate analysis unit 103 analyzes video data throughout the entire contents based on metadata and frame rate information attached to video data as header information, and extracts a high frame-rate portion. Frames of the extracted high frame-rate portion are decimated out at predetermined intervals based on a result of analysis (first frame decimating process) so that an overall playback time of the contents is set to a desired time when the contents are played back at a playback frame rate. The playback frame rate is set based on a display frame rate of a display device.

More specifically, when the display frame rate is 60 Hz, 120 Hz, 240 Hz, the payback frame rate is set to 60 Hz. The playback time of entire contents may be the same as a shooting time or may be adjusted to be shorter or longer in a range of 10% to 30% depending on a shooting time based on genre information of the contents. The playback time of the entire contents as a result of decimating out the frames is calculated as a playback time of the normal playback mode.

In contrast, a playback time in the slow playback mode is calculated as a playback time of the entire contents when all the frames of the high frame-rate portion are played back at the playback frame rate. More specifically, the playback time becomes longer than that of the normal playback mode according to the frame rate and length of time of the high frame-rate portion. In this case, all the frames are played back in the slow playback. However, the frames may be played back at a slow speed by subjecting video data in the high frame-rate portion to a decimating process (second frame decimating process) in which a smaller number of frames is decimated out than in the normal playback mode.

FIG. 8 illustrates frame rate information 801 applied to video contents. A time stamp and a value of a frame rate are recorded in the frame rate information 801. Content information 202 showing a playback time of each scene of video contents is calculated using the frame rate information 801. FIG. 2 illustrates the content information. As to contents A in which one video content is composed of five scenes, FIG. 2 illustrates position information (scene information) of a high frame-rate portion, length information of respective scenes, and a frame rate portion.

In FIG. 2, there are two high frame-rate portions, namely, a scene 2 of 10 seconds and a scene 4 of 20 seconds. A frame rate five times a normal time is inserted to the scene 2, and a frame rate two times the normal time is inserted to the scene 4. A viewing time in the normal playback is 10 minutes 30 seconds. When the high frame-rate portions are played back at a slow speed, the viewing times of the respective high frame-rate portions are 50 seconds and 40 seconds, and a playback time of the entire video contents is 11 minutes and 30 seconds.

Figure 7:
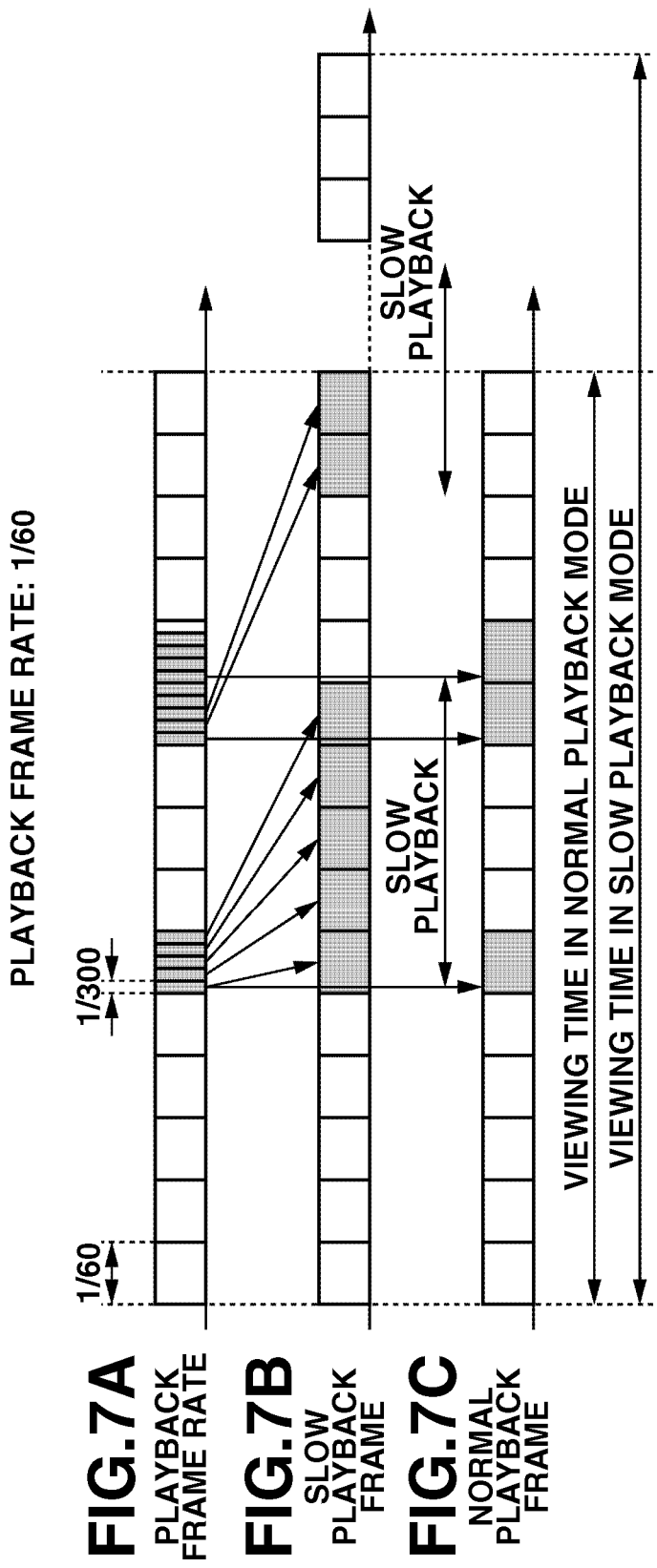
FIG. 7 is an explanatory view illustrating a relation between a record frame rate and a playback frame rate.

FIG. 7 is an explanatory view schematically illustrating a relation of each frame position among the frames recorded by a shooting device, the frames played back in the slow playback mode, and the frames played back in the normal playback mode. The playback frame rate is fixed to 60 Hz. This shows that a playback time is different depending on whether the high frame-rate portions in a record frame are played back by applying the frame decimating process to the video data. A playback time in the normal playback mode (c) is the same as a shooting time (a).

A storage unit 104 is, for example, hard disk drive (HDD) and stores the content information 801 related to input video data and video data.

An image processing unit 107 subjects video data to an image process such as resolution conversion and frame rate conversion. In addition, the image processing unit 107 generates thumbnail data of contents from the video data and stores the thumbnail data in the storage unit 104.

An operation unit 105 is, for example, a remote controller, which causes display of a content list or transmits instruction information such as a content playback to a control unit 109 in response to an operation of the user. A graphics processing unit 106 generates graphic data for displaying content playback time information and a content list screen using the thumbnail data and the content information 202 read out from the storage unit 104. The image processing unit 107 combines the graphic data and the video data subjected to the image process, and transmits them to a display device 108 as display data. The display device 108 is a liquid crystal display device or a plasma display device, and displays video images based on the display data, on a display screen.

The control unit 109 instructs the image processing unit 107 to execute a frame decimating operation in response to instruction information from the operation unit 105 as well as controls the respective processing blocks in association with each other.

Figure 3:
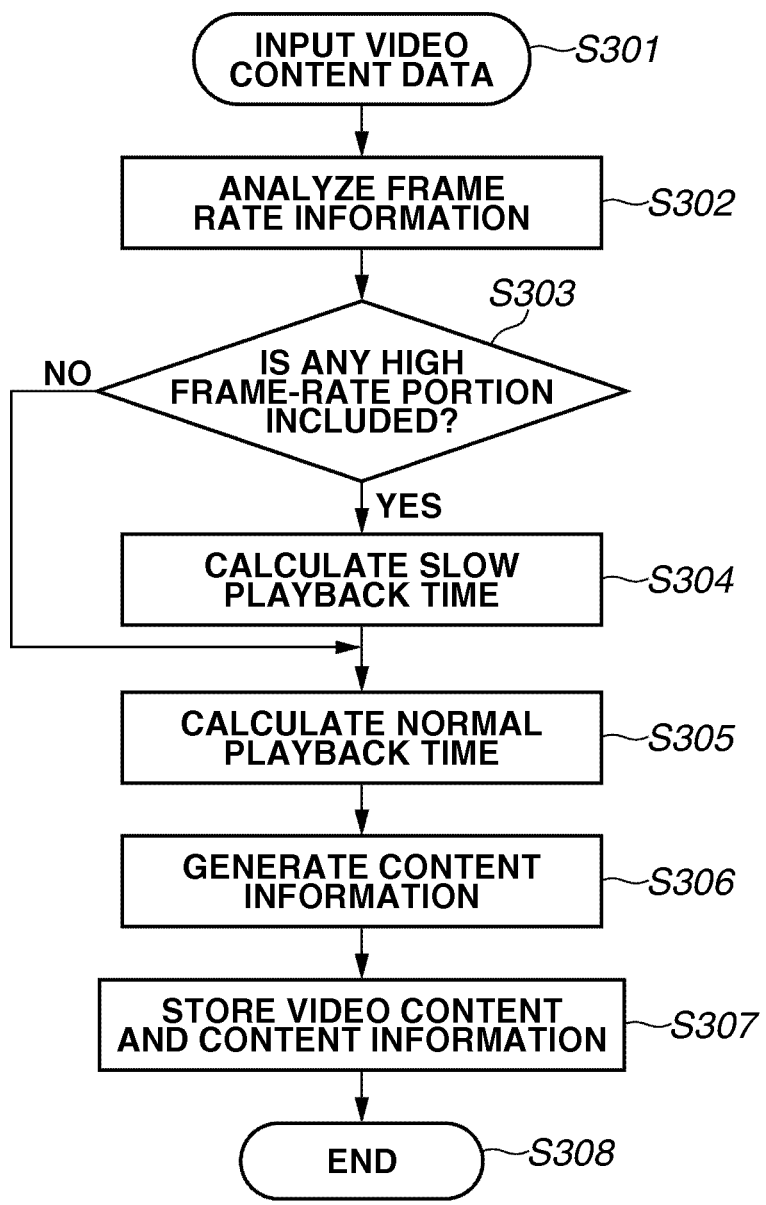
FIG. 3 is a flowchart illustrating a process for generating the content information.

FIG. 3 illustrates a flowchart illustrating a process for storing the content information. In step S301, when data of video content is input, in step S302, a frame rate of entire videos is analyzed by the rate analysis unit 103. More specifically, a frame rate and a playback time of each scene are calculated from the frame rate information 801 attached to the video contents. In step S303, it is determined whether there is a high frame-rate portion based on a result of analysis.

In step S304, when there is the high frame-rate portion, a total playback time in a case where the entire contents are played back at a slow speed is calculated. Further, in step S305, the total playback time in a case where the entire contents are played back at a normal speed is calculated. In step S305, when there is not the high frame-rate portion, only the normal playback time is calculated. In step S306, content information 202 composed of a result of these calculations is generated, and in step S307, the content information 202 is stored in association with data of the video contents in the storage unit 104.

The graphics processing unit 106 generates graphics data for displaying content list 401 composed of information of a plurality of video contents stored in the storage unit 104, in response to an instruction of the user.

Figure 4:
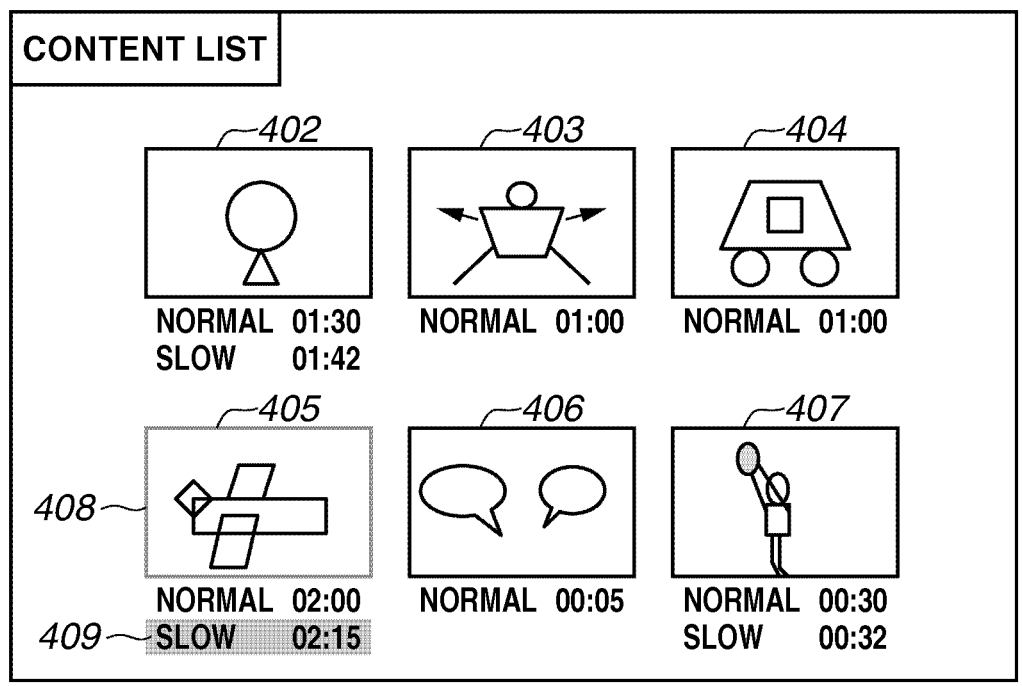
FIG. 4 is a schematic view illustrating a display example of a content list.

FIG. 4 illustrates a display example of the content list 401. The content list 401 displays thumbnail images 402 to 407 of the video contents and a playback time as a display unit in a pair, for each video contents. In the list, the contents 402, 405, and 407 are multi-frame rate contents. As to the multi-frame rate contents, a normal playback time is displayed on a right side of "Normal" and a slow playback time is displayed on the right side of "Slow". These playback times are displayed in parallel or side by side on a screen. Further, only the normal playback time is displayed as to the contents 403, 404, 406 which do not include the high frame-rate portion.

The user moves a select cursor 408 among the thumbnail images by operating the remote controller and selects the contents which the user wants to view. After the user selects the contents, he or she selects a normal playback or a slow playback using a playback method selection cursor. FIG. 4 illustrates the contents 405 selected on the content list 401 and the slow playback selected.

When the slow playback can be executed in a plurality of stages by differentiating a number of frames to be decimated out in the high frame-rate portion, a plurality of "Slow" items may be provided such that items of "Slow ×2", "Slow ×3", and the like and playback time of the respective items may be displayed.

Further, the playback time may be shown by graphics such as an indicator or a progress bar in addition to a numeral.

Further, the playback time may also be displayed when contents are played back in addition to when the content list 401 is displayed. Further, while the video contents are described as the multi-frame rate contents, the invention can also be applied when the entire contents are shot at the high frame rate.

The first exemplary embodiment prompts the user to refer to the playback time display of the content list and to select one of the normal playback mode and the slow playback mode in which he or she views the entire contents. In contrast, the second exemplary embodiment prompts the user to select a playback mode in which he or she views a scene of the high frame-rate portion, in the middle of play-back of the contents.

The user can select contents he or she views through the content list as well as can select a selection/playback mode in which the user can sequentially select the normal playback and the slow playback in each high frame-rate portion. While the selection/playback mode is displayed as "Select" in the content list of FIG. 4, a playback time is not displayed.

Figure 5:
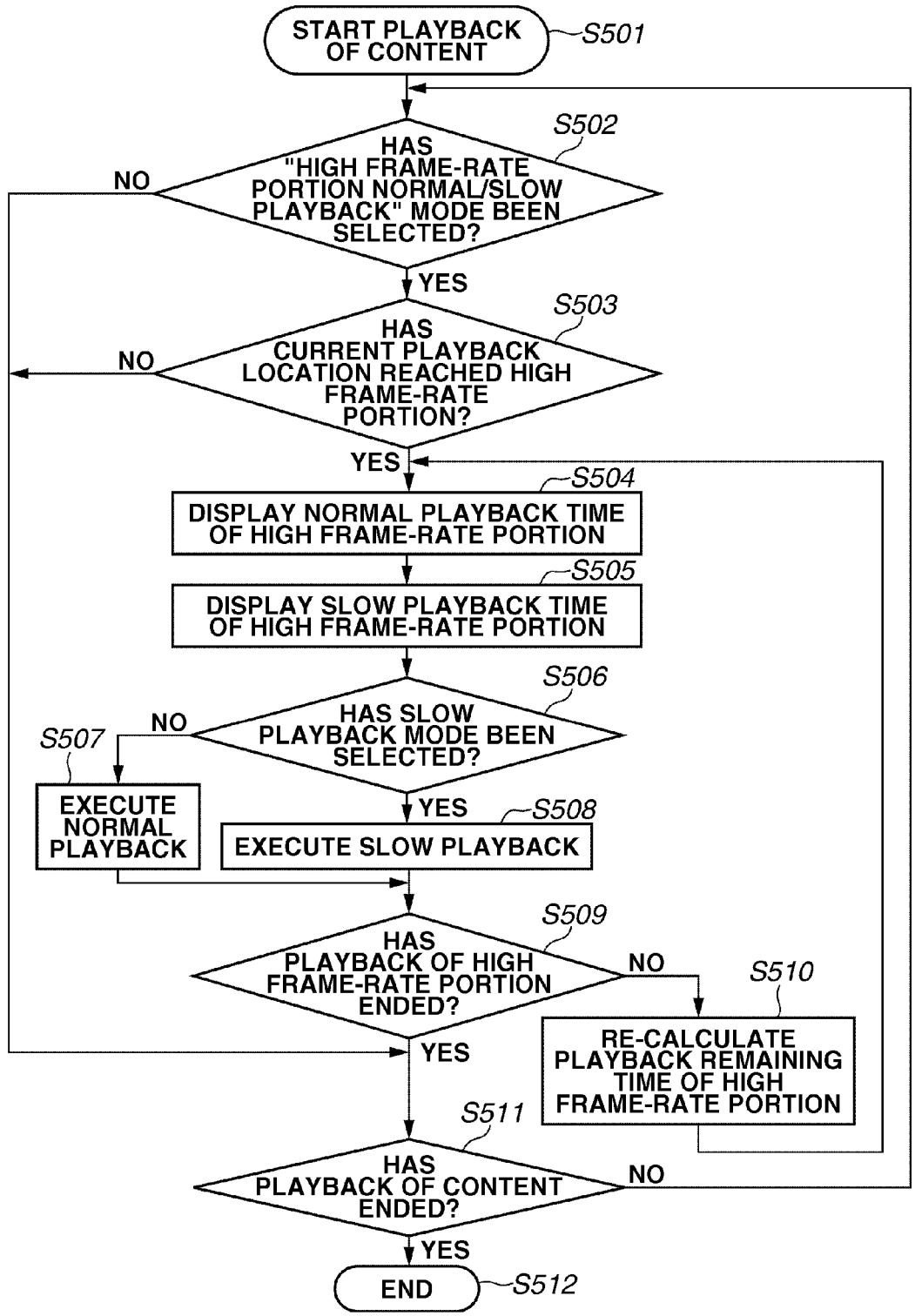
FIG. 5 is a flowchart illustrating a process for generating a playback mode selection screen.

FIG. 5 is a flowchart of the exemplary embodiment. In step S501, when the user operates the remote controller, contents begin to be played back. In step S502, the control unit 109 determines whether the selection/playback mode has been selected. When the selection/playback mode is not selected, the entire contents are played back in the normal playback mode or in the slow playback mode. In step S503, when the selection/playback mode is selected, it is determined whether a high frame-rate portion has been reached in a playback operation. In steps S504 and S505, when the high frame-rate portion has been reached, a playback time when the high frame-rate portion is played back at the normal speed and a playback time when the high frame-rate portion is played back at the slow speed are displayed.

In step S506, the user selects a playback mode for a scene of the high frame rate based on the displayed playback time in the respective playback modes. In steps S507 and S508, the high frame-rate portion is played back in a selected playback mode. In step S509, it is determined whether a playback of the high frame-rate portion has been ended. In step S510, when the playback of the high frame-rate portion has not been ended, a playback remaining time of the high frame-rate portion is re-calculated, and, in steps S504 and S505, remaining playback time in the respective playback modes are displayed. In step S511, when the playback of the high frame-rate portion has been ended, it is determined whether the contents have been entirely played back. In step S512, when the contents have been entirely played back, the flow is ended.

Figure 6:
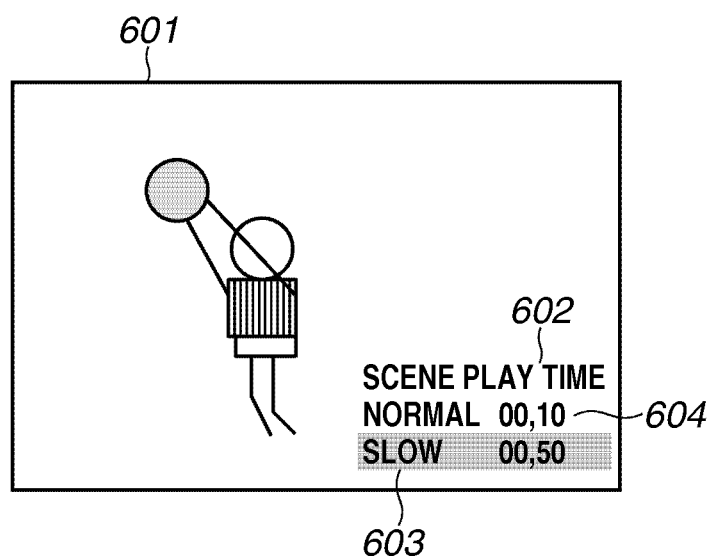
FIG. 6 is a schematic view illustrating a display example of the playback mode selection screen.

FIG. 6 illustrates a display example of graphics when the high frame-rate portion has been reached. A playback time 604 when the high frame-rate portion is played back at the normal speed and a playback time 603 when the high frame-rate portion is played back at the slow speed are displayed on a display screen 601. Until a playback mode is selected, an initial frame of a scene of the high frame rate is displayed as a still image. The user selects a playback mode of the scene by moving a playback method selection cursor 603. Time information 603, 604 shows remaining times until the playback of the scene is ended and are momentarily changed as the playback progresses.

The user can select a playback mode of the scene of the high frame rate on the display screen while referring to the playback time in the respective playback modes.

Although playback time information 602 is displayed simultaneously with start of a playback of the high frame-rate portion, it may also be displayed at time set to be earlier than the start of the playback of the high frame-rate portion. The display can be performed by adding a flag indicating the high frame-rate portion to a frame at the time set earlier than the start of the high frame-rate portion.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-055213 filed Mar. 9, 2009, which is hereby incorporated by reference herein in its entirety.

What is claimed is:

1. A video player, wherein video data is played back by the video player, the video data includes first video data and second video data, the first video data is recorded at a first frame rate, and the second video data is recorded at a second frame rate, the second frame rate is higher than the first frame rate, the video player comprising:
   a calculating unit that calculates a first playback time and a second playback time, wherein the first playback time includes a playback time of the second video data played back in a slow playback mode, and the second playback time includes a playback time of the second video data played back in a predetermined playback mode; and
   a control unit that causes a display device to display predetermined display data so as to select a mode of the video player from either the slow playback mode or the predetermined playback mode, wherein the predetermined display data includes thumbnail data of the video data and predetermined graphic data, and the predetermined graphic data is used for displaying the first playback time and the second playback time.

2. The video player according to claim 1, further comprising:
   an operation unit that selects the mode of the video player from either the slow playback mode or the predetermined playback mode if the predetermined display data is displayed on the display device, wherein
   the control unit controls a playback of the second video data based on a selected mode of the video player.

3. The video player according to claim 1, wherein the predetermined display data is generated by combining the thumbnail data and the predetermined graphic data.

4. The video player according to claim 1, wherein
   the control unit performs a predetermined process if the video player is in the predetermined playback mode, the predetermined process includes a process for reducing a number of frames included in the second video data, and the control unit does not perform the predetermined process if the video player is in the slow playback mode.

5. The video player according to claim 1, wherein
   the control unit performs a first predetermined process if the video player is in the predetermined playback mode, the first predetermined process includes a process for reducing a number of frames included in the second video data, the control unit performs a second predetermined process if the video player is in the slow playback mode, the second predetermined process includes a process for reducing a number of frames included in the second video data, a second number is less than a first number, the first number indicates a number of frames reduced based on the first predetermined process, and the second number indicates a number of frames reduced based on the second predetermined process.

6. A video player, wherein video data is played back by the video player, the video data includes first video data and second video data, the first video data is recorded at a first frame rate, and the second video data is recorded at a second frame rate, and the second frame rate is higher than the first frame rate, the video player comprising:

a calculating unit for calculating a first playback time and a second playback time, wherein the first playback time includes a playback time of the second video data played back in a slow playback mode, and the second playback time includes a playback time of the second video data played back in a predetermined playback mode; and a control unit that causes a display device to display predetermined display data so as to select a mode of the video player from either the slow playback mode or the predetermined playback mode if a playback of the second video data is started, the predetermined display data includes image data and predetermined graphic data, the image data is included in the second video data, and the predetermined graphic data is used for displaying the first playback time and the second playback time.

7. The video player according to claim 6, further comprising:

an operation unit that selects the mode of the video player from either the slow playback mode or the predetermined playback mode if the predetermined display data is displayed on the display device, wherein the control unit controls a playback of the second video data based on a selected mode of the video player.

8. The video player according to claim 6, wherein the predetermined display data is generated by combining the image data and the predetermined graphic data.

9. The video player according to claim 6, wherein the predetermined display data is not displayed on the display device if the second video data is not played back.

10. The video player according to claim 6, wherein the control unit performs a predetermined process if the video player is in the predetermined playback mode, the predetermined process includes a process for reducing a number of frames included in the second video data, and the control unit does not perform the predetermined process if the video player is in the slow playback mode.

11. The video player according to claim 6, wherein the control unit performs a first predetermined process if the video player is in the predetermined playback mode, the first predetermined process includes a process for reducing a number of frames included in the second video data, the control unit performs a second predetermined process if the video player is in the slow playback mode, and the second predetermined process includes a process for reducing a number of frames included in the second video data, a second number is less than a first number, the first number indicates a number of frames reduced based on the first predetermined process, and the second number indicates a number of frames reduced based on the second predetermined process.

12. A playback method of playing back video data, wherein the video data includes first video data and second video data, the first video data is recorded at a first frame rate, and the second video data is recorded at a second frame rate, and the second frame rate is higher than the first frame rate, the method comprising:

calculating a first playback time and a second playback time, wherein the first playback time includes a playback time of the second video data played back in a slow playback mode, and the second time includes a playback time of the second video data played back in a predetermined playback mode; and causing a display device to display predetermined display data so as to select a mode of the video player from either the slow playback mode or the predetermined playback mode, wherein the predetermined display data includes thumbnail data of the video data and predetermined graphic data, and the predetermined graphic data is used for displaying the first playback time and the second playback time.

13. A playback method of playing back video data, wherein the video data includes first video data and second video data, the first video data is recorded at a first frame rate, and the second video data is recorded at a second frame rate, and the second frame rate is higher than the first frame rate, the method comprising:

calculating a first playback time and a second playback time, wherein the first playback time includes a playback time of the second video data played back in a slow playback mode, and the second time includes a playback time of the second video data played back in a predetermined playback mode; and causing a display device to display predetermined display data so as to select a mode of the video player from either the slow playback mode or the predetermined playback mode if a playback of the second video data is started, the predetermined display data includes image data and predetermined graphic data, the image data is included in the second video data, and the predetermined graphic data is used for displaying the first playback time and the second playback time.

* * * * *